UNITED STATES PATENT OFFICE.

WASHINGTON LAFAYETTE GOLDSMITH, OF MERIDIAN, MISSISSIPPI.

PROCESS OF MAKING FERTILIZERS.

SPECIFICATION forming part of Letters Patent No. 620,443, dated February 28, 1899.

Application filed August 25, 1897. Serial No. 649,526. (No specimens.)

*To all whom it may concern:*

Be it known that I, WASHINGTON LAFAYETTE GOLDSMITH, a citizen of the United States, residing at Meridian, in the county of Lauderdale and State of Mississippi, have invented certain new and useful Improvements in the Manufacture of Superphosphates and Fertilizers; and I do hereby declare the following to be a full, clear, and exact description of the invention, such as will enable others skilled in the art to which it appertains to make and use the same.

This invention relates to improvements in the manufacturing of superphosphates and fertilizers; and it consists in combining the following ingredients in about the quantities mentioned chemically and by intermixing same before being used.

My process is as follows: To about every hundred pounds of phosphate rock or quantitative proportion thereof take about fifteen to thirty pounds of lignite or bituminous coal and together dump or place in crusher to be crushed, so as to be carried in elevators or otherwise to the phosphate-grinding mills or pulverizers together and there to be thoroughly pulverized or ground and intermixed. This intimately-mixed powdered rock and lignite is then placed in a suitable mixing-pan having revolving plows or mixers and acidulated with about one hundred pounds of sulfuric acid having preferably a specific gravity of 1.526 or 50° as per Baumé hydrometer, the mixture remaining in said mixing-pan from three to five minutes.

The formula to be used is: To one thousand to thirteen hundred pounds of the mixed, ground, or pulverized phosphate rock and lignite or bituminous coal add about one thousand pounds of sulfuric acid, preferably of a specific gravity of 1.526 or 50° as per Baumé hydrometer. This mixture is retained in the mixing-pans, where it is acted on by the revolving plows or mixers for from three to five minutes, and then the resultant superphosphate is dumped into bins or dumping-sheds for future use. In making what is called the "wet mixture"—that is, when the materials containing nitrogen, potash, &c., are put in the mixing-pan at or about the same time with the combined floats and lignite or the bituminous coal and the sulfuric acid, as aforesaid—substantially the same steps are followed; but the amount of mixed rock and lignite or coal is reduced in quantity, so as to make, when all combined and acidulated, from two thousand to two thousand two hundred pounds of complete fertilizer.

The beneficial results will be as follows:

With the refractory phosphate rock, analyzing over three per cent. of the oxids of iron and aluminium combined or less than seven per cent. of carbonate of lime, or for any other deficiency in said phosphate rock, the use of said process as above set forth will cause the ground rock and the floats to readily and thoroughly acidulate and reduce the insoluble phosphoric acid, which is practically valueless as plant-food, to available phosphoric acid, which is very valuable as plant-food.

The benefits by the use of my process will be a great reduction in the amount of insoluble phosphoric acid in the resulting superphosphate—that is, when without the use of my process the resulting superphosphate carries from three to six per cent. of insoluble phosphoric acid, which is practically valueless, by my process said insoluble phosphoric acid will be reduced to from one to three per cent. and the available phosphoric acid correspondingly increased and made valuable as plant-food.

The beneficial results will be very great in using my process with any phosphate rock, even running in analyses below three per cent. of iron and aluminium combined or as much as seven per cent. of carbonate of lime, because of the quick and satisfactory drying of the resulting superphosphates, which facilitates its being used for manufacturing fertilizers or bagged for consumers' use.

Another beneficial result of my process is the dark or dark-brown coloring given the superphosphate and its benefits as a filler.

As regards fertilizers my process consists in using about one hundred and fifty to three hundred pounds of ground or pulverized lignite or bituminous coal to about twelve hundred pounds of superphosphate and enough of other compounds or ingredients to make from one to four per cent. of nitrogen and one to four per cent. of potash and manipulating or intermixing same together, so as to make two thousand pounds or one ton of complete fertilizer, the beneficial results being the dark or dark-brown color of the goods, also as a filler, and the holding by the ground lignite or bituminous coal of the ammonia, potash, and other gases of said ingredients until the fertilizer is put into the ground to be used as plant-food.

I am aware that prior to my invention it has been proposed in the manufacture of fertilizer to reduce phosphate rock to a powdered form and then incorporate with such powdered material a small proportion of carbonaceous material which has been previously moistened with sulfuric acid; also, that it has been proposed to apply sulfuric acid directly to powdered phosphate material and while the resulting chemical changes are taking place to add finely-ground coal for the purpose of absorbing the gases thrown off during the admixture of the sulfuric acid and raw phosphates. My process, however, differs in important particulars from either of the above, and by it I am enabled to recover or separate from the raw phosphate material a much larger percentage of the phosphoric acid than has been possible with any other process known to me. By practical experiment I have found that when the phosphate material and lignite in the proportions named are ground together and simultaneously reduced to a finely-powdered condition and thoroughly intermingled prior to applying sulfuric acid from two to six per cent. more of phosphoric acid will be obtained than if the acid were applied directly to the raw phosphate or applied to carbonaceous material and that mixed with the phosphate material—that is, by thoroughly mixing the lignite with the raw phosphate material I supply the ingredients which are lacking in the raw material itself and which are necessary in order that the sulfuric acid may have full and complete effect and free the greatest possible amount of phosphoric acid.

Having thus described my invention, what I claim as new, and desire to secure by Letters Patent, is—

The herein-described process of manufacturing superphosphates and fertilizer consisting in simultaneously pulverizing and thereby intimately mixing raw phosphate material and suitable carbonaceous material, and then applying sulfuric acid to the resulting powder-like mass, substantially as set forth.

In testimony whereof I have signed this specification in the presence of two subscribing witnesses.

WASHINGTON LAFAYETTE GOLDSMITH.

Witnesses:
B. J. CARTER,
EDWIN M. MARVIN.